March 16, 1954     C. A. STOKES     2,672,402
PROCESS OF PRODUCING CARBON BLACK AND SYNTHESIS GAS
Filed May 23, 1951     2 Sheets-Sheet 1

INVENTOR.
Charles A. Stokes.
BY Kenway, Jenney, Witter & Hildreth.
ATTORNEYS

March 16, 1954 C. A. STOKES 2,672,402
PROCESS OF PRODUCING CARBON BLACK AND SYNTHESIS GAS
Filed May 23, 1951 2 Sheets-Sheet 2
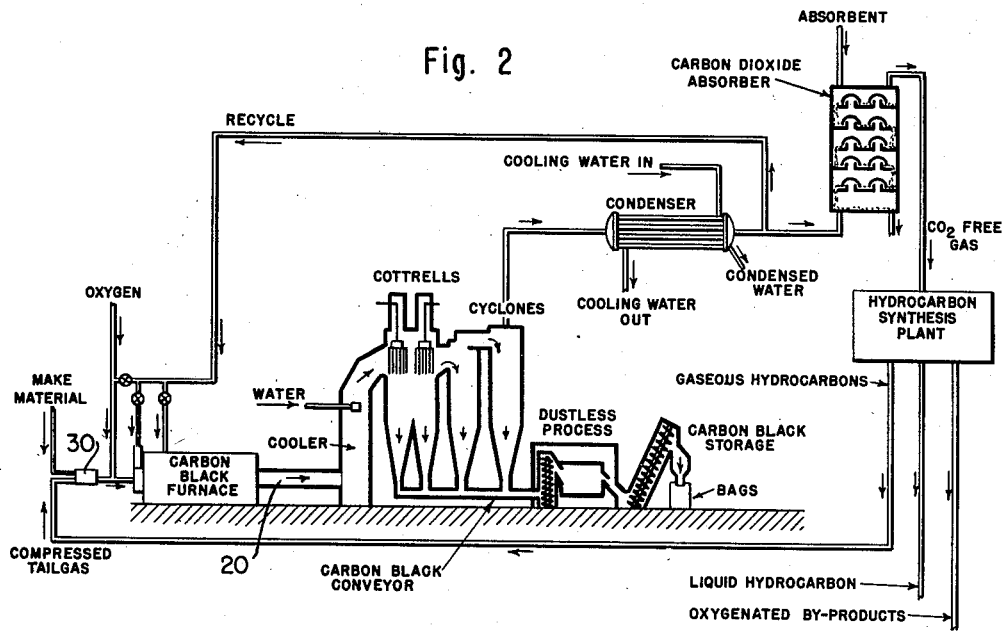
Fig. 2
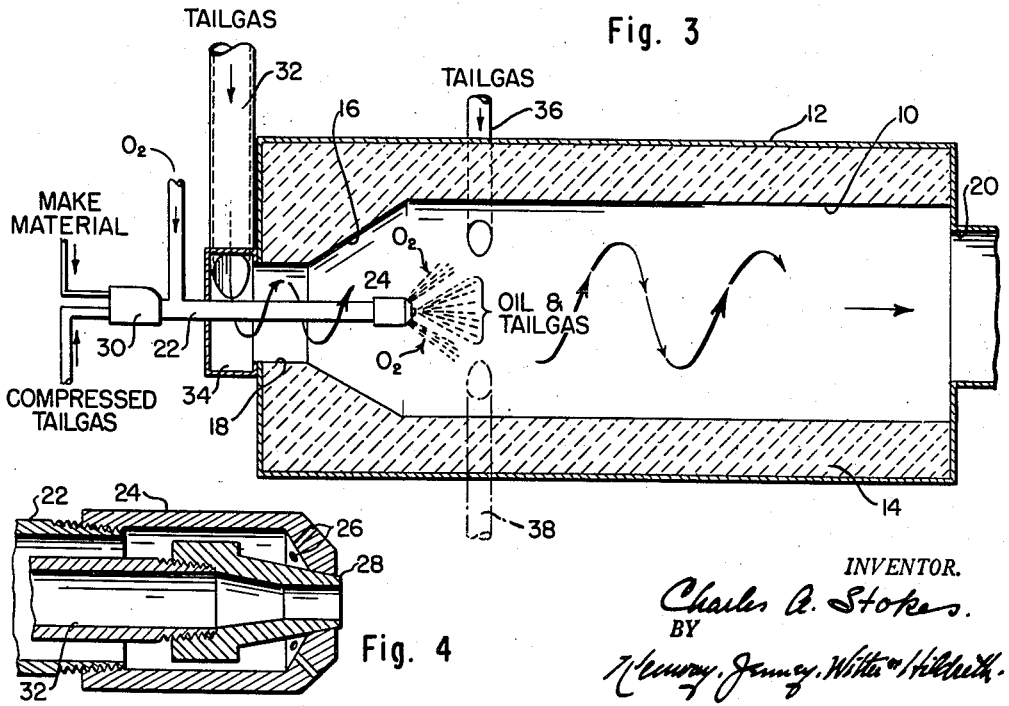
Fig. 3
Fig. 4
INVENTOR.
Charles A. Stokes.
BY
ATTORNEYS Patented Mar. 16, 1954

2,672,402

UNITED STATES PATENT OFFICE 2,672,402

PROCESS OF PRODUCING CARBON BLACK
AND SYNTHESIS GAS

Charles A. Stokes, Wellesley Hills, Mass., assignor to Godfrey L. Cabot, Inc., Boston, Mass., a corporation of Massachusetts Application May 23, 1951, Serial No. 227,915

3 Claims. (Cl. 23—209.8)

This invention consists in a novel and unitary process of making carbon black and a synthesis gas. It is characterized by the step of burning streams of a gaseous medium containing a hydrocarbon in liquid or vapor form together with oxygen, in the absence of air, in a confined and unobstructed combustion space. It has the advantage of increasing the yield of carbon black and of producing also a valuable gaseous product.

It has been the practice for some time to manufacture liquid fuels from natural gas using a synthesis gas made from natural gas and oxygen and consisting of CO and $H_2$. In that process, for example, dry natural gas may be burned under high pressure with oxygen to yield a synthesis gas having carbon monoxide and hydrogen as its principal constituents and a composition that may be controlled within narrow limits. The process may be carried to its conclusion on the Fischer-Tropsch synthesis principle whereby a gaseous mixture of carbon monoxide and hydrogen passed over a catalyst under suitable conditions of temperature and pressure is caused to yield hydrocarbons in the liquid fuel range. I have discovered that by supplying a liquid hydrocarbon in dispersed or vapor form and oxygen in the proper proportions to the combustion space of a carbon black producing furnace, I can not only improve the yield and production rate of carbon but produce a tail-gas which is of the composition desired for the Fischer-Tropsch synthesis. For each 15,000 cubic feet of this synthesis gas charged to the plant, one barrel of crude synthetic oil and substantial amounts of valuable oxygenated compounds, including alcohols, ketones and aldehydes, are produced.

I have found that the use of pure oxygen with such dispersed or vaporized liquid hydrocarbons and without compensating procedure sometimes tends to produce a troublesome concentration of carbon black within the combustion chamber. There is, moreover, in some cases a deleterious effect on the quality of the carbon black due to the high concentration of the reacting hydrocarbon fuel, and a tendency to form carbon black of large particle size. Both of these difficulties I have been able to overcome without sacrificing the yield of high grade Fischer-Tropsch synthesis gas. As a further feature of my invention, therefore, I contemplate recirculating a substantial portion of the tail-gas, and mixing it with the oxygen to form a dilute oxygen mixture which may then be burned with the liquid hydrocarbon. The re-introduction of carbon monoxide and hydrogen with the oxygen delivered to the combustion space has a favorable effect in suppressing some of the carbon destroying reactions, as to a certain extent the oxygen burns the CO and $H_2$ first, thus tending to increase the net recovery of carbon from the carbonaceous medium consumed. The carbon destroying reactions suppressed or reduced in this manner are (1) the burning of the hydrocarbon charge (since carbon monoxide and hydrogen will burn more rapidly), and (2) a reduction in the water gas reaction $$C + H_2O \rightleftharpoons CO + H_2$$

due to the already high partial pressure of carbon monoxide and hydrogen tending to prevent the reaction from taking place to the right.

By the process of my invention a stack or tail-gas is produced which contains large quantities of CO and $H_2$ contaminated only with relatively small amounts of $CO_2$, water vapor, and undecomposed hydrocarbon, all of which can be removed from the CO and $H_2$ by convenient and inexpensive steps; for example, by scrubbing the tail-gas with an alkaline solution to remove carbon dioxide and any hydrogen sulfide and drying the gas by absorption, adsorption, or refrigeration.

It may be noted at this point in explanation of the advantages of the present invention that if air should be used with the charged gaseous medium rather than oxygen, the tail-gases would be contaminated with nitrogen which cannot be removed except by a costly liquefaction process.

It is evident that in mixing pure oxygen with CO and $H_2$, an explosive mixture is likely to result. It is important, therefore, to carry out this step under certain safeguards; for example, it may be desirable to dilute the $CO-H_2$ recycle gas with extra quantities of $CO_2$ and water vapor to reduce the inflammability limits of the mixture. This is not objectionable because both $CO_2$ and water vapor tend to some extent to be converted to $H_2$ and CO under the reducing conditions within the combustion space.

Incidentally, some of the less desirable liquid hydrocarbon products of the Fischer-Tropsch synthesis may be used as fuel for the carbon black furnace, or the resulting oil may be catalytically cracked to produce additional gasoline and the recycle gas oil could be burned to make carbon and more synthesis gas. By proceeding in this manner we have a process which produces two marketable products, high-grade gasolene and high-grade carbon black, and no unused by-products.

My invention contemplates the employment of an all liquid hydrocarbon feed; no natural gas being needed at all. The methane and ethane produced in the Fischer-Tropsch synthesis would in this case be returned to the carbon black furnace, this being a most desirable use for such by-product gas.

The desired ratio of hydrogen to carbon monoxide for the Fischer-Tropsch synthesis is about two. This is obtained by the reaction $$CH_4 + 1/2 O_2 \rightarrow CO + 2H_2$$

When some of the carbon is removed in the form of carbon black this ratio is somewhat increased. Some of the hydrogen may be also removed in the form of water. Operating conditions may be adjusted to permit this result.

These and other characteristics of my invention will be best understood and appreciated from the following description of a preferred manner of putting it into practice as suggested by the accompanying flow sheet and apparatus shown in the accompanying drawings in which:

Fig. 2 is a diagrammatic view of a plant for carrying out the process,

Fig. 3 is a fragmentary view showing diagrammatically one form of reactor used in carrying out the combustion step of the process, and Fig. 4 is a sectional view of a suitable burner nozzle.

Figure 1:
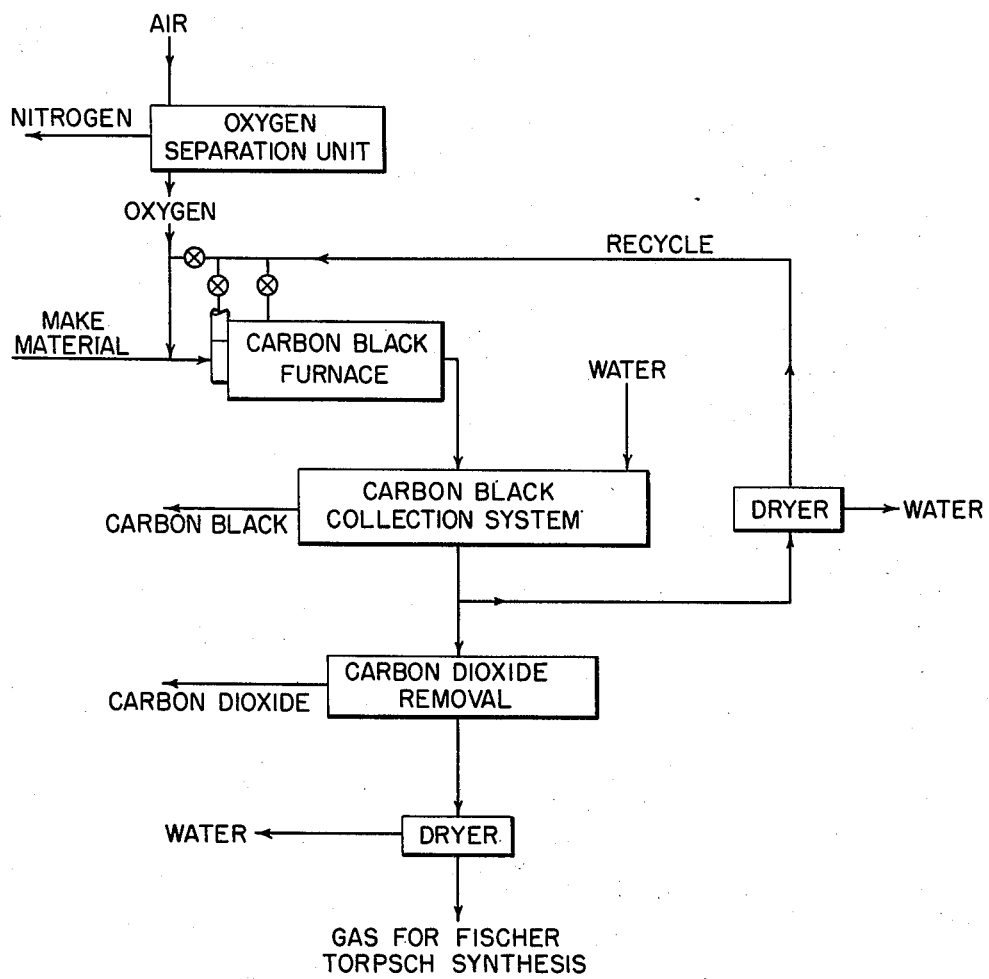
Fig. 1 is a diagrammatic flow sheet of the process.

Referring first to the flow sheet, it may be assumed that the carbon black furnace therein indicated is of the general type fully disclosed in copending application Serial No. 142,068 filed February 2, 1950, Friauf et al., as one form of reactor suitable for carrying out my novel process. To the burner of this furnace a liquid hydrocarbon, referred to as "make material," is supplied by the pipe line marked "Make Material" and oxygen is supplied by the pipe line marked "Oxygen" from an oxygen separation unit of any convenient or commercial design. The make material may be a preheated residual oil, hereinafter described, atomized by a gas or by pressure, or it may be gas-oil which can be introduced into the furnace as a vapor alone or admixed with tail-gas or other suitable gaseous medium. Oxygen is supplied in a ratio of about two volumes of make material to about one volume of oxygen. The make material thus supplied is burned under conditions of partial combustion within the furnace, the oxygen being completely consumed. The products of combustion and carbon black are led from the furnace to a conventional carbon black collection system.

The carbon black may be drawn off through the duct marked "Carbon Black" and the tail-gases advanced to a carbon dioxide removal station. At this stage carbon dioxide may be removed by scrubbing the gas with an alkaline solution and discharged through the pipe marked "Carbon Dioxide." At this stage also any nitrogen may be purged and when the make material has a high sulfur content, the sulfur compounds in the tail-gas may be removed by suitable equipment.

The recycle gas may be led from the duct leaving the carbon black collection system and re-cycled through a dryer, marked "Dryer" in the flow sheet, to form part of the make material or with the oxygen supplied to the carbon black furnace, or to be delivered directly to the furnace simultaneously with them. The flow sheet indicates valved connections for any one of the desired dispositions of the recycle gas. In some cases it may be desirable to omit the step of drying the recycle gas, since, as already pointed out, in the combustion space the water vapor will break down into CO and $H_2$.

Upon leaving the alien gas removal stations, if the water is to be removed, the tail-gas is passed through a dryer and the dry gas produced is ready for Fischer-Tropsch synthesis.

In order to proceed under the same conditions that are now employed in making several grades of standard furnace carbon blacks from aromatic tars, for example, the amount of tail-gas re-circulated is adjusted to about four volumes of the gas-atomized hydrocarbon supplied to the system; that is to say, there is delivered to the combustion space two volumes of gas-tar or gas-oil, one volume of oxygen, and four volumes of recycle gas. Since the recycle gas is substantially all combustible, this means about six parts of combustible materials to one part of oxygen.

In using this ratio of gaseous ingredients I have found it desirable to feed the make material which is to be cracked to carbon black, i. e. the gas-atomized liquid or vaporized hydrocarbon oil, to the furnace in a divergent atomized spray or gaseous cone. The desired results may be secured by suitable modification of equipment disclosed in the application of Friauf et al. above identified.

Referring to Fig. 3, the furnace herein shown includes an elongated reaction chamber 10 which is preferably circular in cross-section and is enclosed within a steel shell 12 with a lining 14 of refractory material. At its left or inlet end the reaction chamber tapers as shown at 16 to an inlet passage or throat 18 of substantially less diameter than that of the reaction chamber 10 of the furnace and which provides the main inlet to the furnace. This furnace taper 16 is important in that it approximates the angle of the oil spray and thus promotes more efficient transfer of radiant heat to the oil containing cone. A burner pipe 22 is centered in the throat 18 and extends into the reaction chamber 10. The chamber is open at the end opposite the burner and communicates with a flue 20 for the passage of the gaseous products of combustion and entrained carbon black to the collectors and other elements of the apparatus as shown in Fig. 2.

The combination burner through which the make material and supplemental gases are introduced into the furnace is shown in Figs. 3 and 4. This burner consists of a horizontal pipe 22 terminating at its inner end in a composite head 24 provided with a circular series of oxygen orifices 26 and a central nozzle 28. The forward edge of the head 24 is beveled to present a conical surface at any desired degree of angularity to its axis. The orifices 26 may be directed outwardly either radially or forwardly at an angle of less than 90° to the axis of the burner pipe as shown in Fig. 4.

The pipe 22 terminates outside the furnace in a mixing chamber 30 where the liquid hydrocarbon oil, preheated if desired to improve its fluidity, is supplied through the inlet pipe marked "Make Material" and is initially aspirated by and mixed with re-circulated tail-gas supplied through the pipe marked "Compressed Tail-Gas." The hydrocarbon mixture thus formed is supplied to the head 24 through a smaller pipe 32 enclosed within the burner pipe 22 and is delivered in the manner already stated from the nozzle 28. The mixing chamber 30 may be of any conventional design which employs the two fluid atomization principle. Many such are readily available and satisfactory for the purposes of this invention.

Oxygen is supplied to the burner pipe 22 through the pipe marked "O₂" and is delivered to the reaction chamber through the orifices 26 as a hollow cone enveloping the hydrocarbon cone delivered by the nozzle 28.

Re-circulated tail-gas is delivered to the furnace by a duct 32 which leads tangentially to a circular header 34 located adjacent to the throat 18 of the furnace. Tail-gas is thus delivered in such fashion as to form a whirling blanket upon the inner wall of the reaction space surrounding the composite cone which is being delivered by the head 24. Supplementary streams of tail-gas may be delivered to the reaction space through ducts 36 and 38 which open tangentially into the sides of the furnace.

The approximate distribution of the ingredients will be apparent from Fig. 3 of the drawings. A jet of unburned atomized or vaporized oil issues from the nozzle 28. This is surrounded on all sides by an area of oxygen and that in turn is surrounded by a whirling blanket of tail-gas. Directly opposite the burner pipe is a luminous zone wherein the carbon black is formed. On all sides of this zone and partially overlapping the adjacent zones is a zone where the oxygen burns with the recycle gas and also with the oil spray or vapor. Beyond these definite zones the oxygen has disappeared and carbon black is formed at high temperature from the products of combustion as they advance toward the outlet duct 20 of the combustion space.

In Fig. 2 is shown a plant organized to operate in accordance with the flow sheet of Fig. 1. The various elements of the plant are clearly marked. The furnace may be of the type above described. The products of combustion, including the particles of carbon black suspended therein, pass directly from the furnace to a vertical cooler wherein a spray head distributes cooling water to the rising gas-borne column of carbon black particles. The partially cooled aerosol is then passed through a pair of Cottrell separators and then to a pair of cyclone separators. The carbon black is precipitated and delivered by an underlying conveyor to apparatus marked "Dustless Process" wherein the flocculent carbon black is converted into dustless self-sustaining pellets. In this form it is conveyed by an inclined screw conveyor to a storage chamber from which it can be conveniently packed into bags.

Meanwhile the gaseous products of combustion are drawn from the second cyclone separator in the series and conducted through a condenser wherein they are further cooled. Upon leaving the condenser the gas may be recycled at once to the furnace or to the oxygen supply pipe or to the mixing chamber 30. The remainder of the recycle gas is caused to flow upwardly through a carbon dioxide absorber herein shown as consisting of a bubble cap tower. The gas now freed from CO₂ is conducted directly to a station for hydrocarbon synthesis marked "Hydrocarbon Synthesis Plant." From this may be drawn gaseous hydrocarbons to be returned to the furnace, liquid hydrocarbons and oxygenated by-products.

The process of this invention may be carried out with any suitable liquid hydrocarbon, even with residual oils and tars that are procurable at low cost. The term "residual oil" is used herein to include a wide variety of oils and tars remaining from various types of hydrocarbon distillation and cracking operations. In its broader sense and as used in the petroleum art, the term "residual fuel" includes every type of residue from such operations, including the tar-like substances left from the destructive distillation of coal. All such oils are characterized by being not fully vaporizable under atmospheric conditions and some of them will crack before as little as 50% has gone overhead. The greatly preferred residual oils are those which fall within the following range of physical characteristics:

Viscosity in excess of 60 Saybolt seconds universal at 100° F.
Viscosity in excess of 30 Saybolt seconds universal at 210° F.
A. P. I. gravity less than 11.
Specific gravity in excess of .98 at 60° F.
Hydrogen-carbon ratio of between .75 to 1.25.
Conradson carbon residue in excess of 3%.

However, I can produce carbon black and synthesis gas from other liquid hydrocarbons or tars, or from other residual fuels, although it has been found that oils in the limited category above defined are preferred by reason of their high yields of good quality carbon blacks.

Having thus disclosed the process of my invention and described in detail an illustrative example thereof, I claim as new and desire to secure by Letters Patent:

1. A continuous process of producing carbon black and synthesis gas for liquid fuel, which is characterized by the steps of introducing a gas atomized spray of liquid hydrocarbon into an elongated reaction space, simultaneously introducing substantially pure oxygen into said chamber in a plurality of jets initiated in a circle around and closely adjacent the oil spray, flowing a stream of substantially nitrogen-free recycle gas past the jets and spray, burning a portion of the combustibles in said reaction space thus dissociating a portion of the liquid hydrocarbon to carbon black and producing tail gas consisting essentially of hydrogen, carbon monoxide, and carbon dioxide, separating the carbon black from the tail gas, recycling a portion of the tail gas to the reaction space, separating the carbon dioxide and water from the remainder of the tail gas and recovering the synthesis gas thereby produced.

2. A continuous process of producing carbon black and synthesis gas for liquid fuel, which is characterized by the steps of continuously delivering to an unobstructed combustion space contiguous streams of (1) a gaseous medium containing a hydrocarbon oil, (2) nitrogen-free recycle gas, and (3) substantially pure oxygen, and maintaining reaction temperature by partial combustion of the oxygen with the recycle gas and the hydrocarbon oil contained in the said gaseous medium thereby producing carbon black and tail gas consisting essentially of hydrogen, carbon monoxide, and carbon dioxide, separating the carbon black from the tail gas, recycling a portion of the tail gas to the combustion space, separating the carbon dioxide from the remainder of the tail gas and recovering the synthesis gas thereby produced.

3. A continuous process for producing carbon black and synthesis gas for liquid fuel comprising the steps of delivering to an unobstructed reaction space a central spray of normally liquid hydrocarbon, surrounding said spray with a plurality of jets of substantially pure oxygen, flowing a stream of nitrogen-free recycled tail gas past the jets of oxygen and the liquid hydrocarbon spray, burning a portion of the liquid hydrocarbon and the recycled tail gas to dissociate the remainder of the liquid hydrocarbon, thereby producing carbon black and tail gas consisting essentially of hydrogen, carbon monoxide and carbon dioxide, separating the carbon black from the tail gases, recycling a portion of the tail gases to the reaction space, separating the carbon dioxide and water from the remainder of the tail gas and recovering the synthesis gas thereby produced.

CHARLES A. STOKES.

References Cited in the file of this patent

UNITED STATES PATENTS

| Number | Name | Date |
|---|---|---|
| Re. 22,886 | Ayers | June 3, 1947 |
| 1,448,655 | Darrah | Mar. 13, 1923 |
| 1,741,532 | Morse | Dec. 31, 1929 |
| 1,765,991 | Miller | June 24, 1930 |
| 1,887,407 | Forney | Nov. 8, 1932 |
| 1,902,797 | Burke | Mar. 21, 1933 |
| 1,954,991 | Garner | Apr. 17, 1934 |
| 2,124,175 | Zink | July 19, 1938 |
| 2,556,196 | Krejci | June 12, 1951 |
| 2,564,736 | Stokes | Aug. 21, 1951 |